E. L. DELANY.
BALL COCK.
APPLICATION FILED AUG. 11, 1910.
1,070,234.
Patented Aug. 12, 1913.
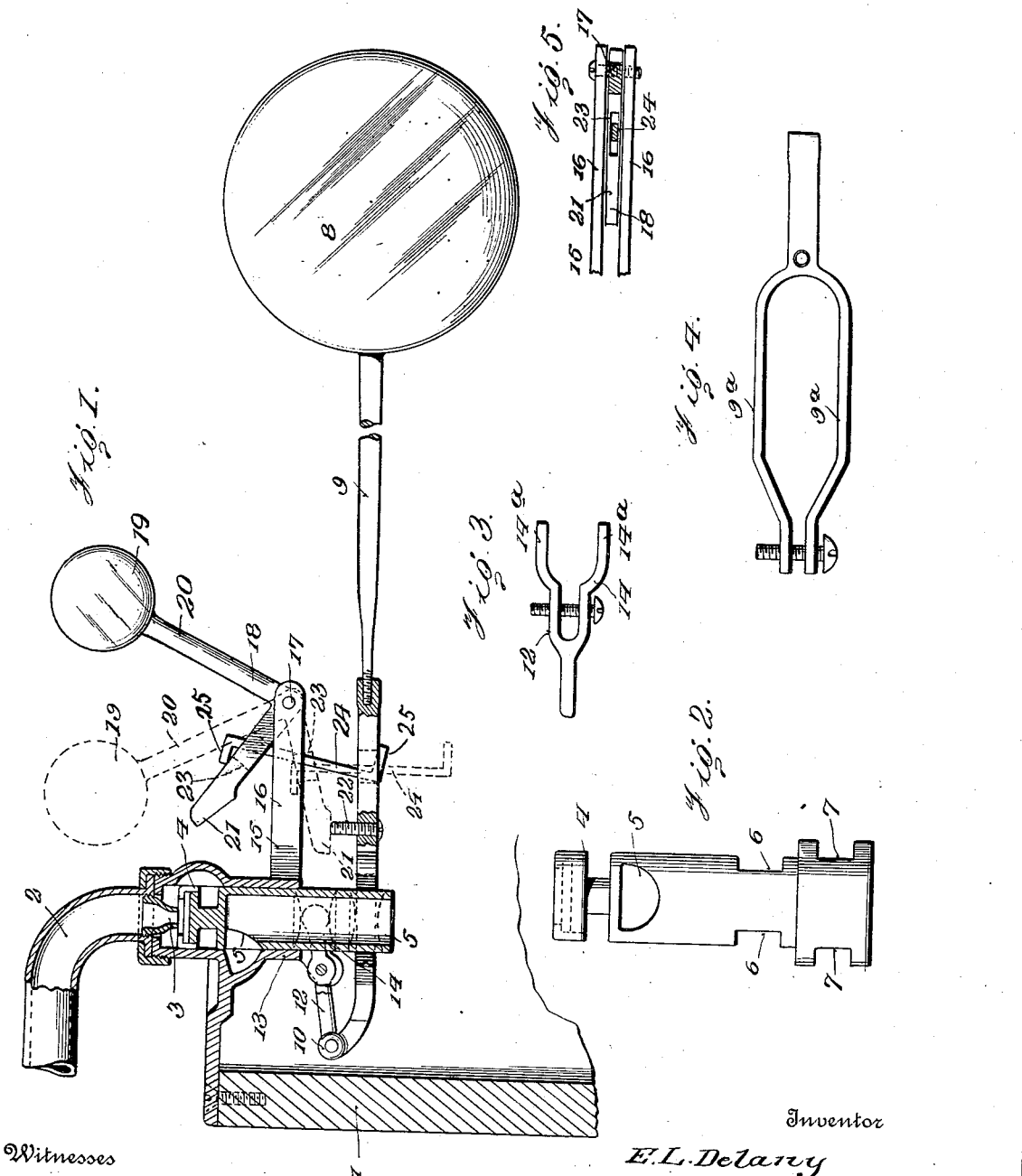
Witnesses
Inventor
E. L. Delany
By
Attorney ic

UNITED STATES PATENT OFFICE.

EDWARD L. DELANY, OF NEW YORK, N. Y.

BALL-COCK.

1,070,234.

Specification of Letters Patent.

Patented Aug. 12, 1913.

Application filed August 11, 1910. Serial No. 576,693.

*To all whom it may concern:*

Be it known that I, EDWARD L. DELANY, of the city of New York and State of New York, have invented certain new and useful Improvements in Ball-Cocks; and I do hereby declare the following to be a full, clear, and exact description of the invention, such as will enable others skilled in the art to which it appertains to make and use the same.

This invention relates to compound lever ball cocks.

The invention comprehends a compound leverage exerted upon the valve directly by the float rod and by a second lever actuated by the rod.

In the accompanying drawing I have illustrated the invention as adapted to a flush tank.

Figure 1 is a vertical sectional view. Fig. 2 is a side elevation of the valve, and Figs. 3, 4 and 5 are plan views of details.

Referring to the drawing 1 designates a tank of the usual or any preferred construction into which leads a supply pipe 2 having an outlet port 3 controlled by the spindle valve 4, the water passing through port 3 and the orifice 5 in the spindle valve when the valve is unseated.

As shown in Fig. 2, the spindle valve is preferably formed on opposite sides with notches or recesses 6 and a second pair of notches 7. The float 8 is carried on the outer end of a rod 9 and the inner extremity of the latter is forked or bifurcated, its parallel members 9ª passing through the notches 7 of the spindle valve. The rod is extended inward beyond the spindle valve and is fulcrumed as at 10 to the long arm of a lever 12 and the latter is fulcrumed upon the casing 13 in which the spindle valve moves, the shorter arm 14 of lever 12 being forked as at 14ª and having its parallel members within the notches 6 of the spindle valve.

When the float rises with the water level and elevates the rod 9, the latter acts directly upon the valve 4 to lift it to its seat. At the same time the rod 9, being fulcrumed, not on a rigid support, but upon a second lever as 12, in rising turns the lever 12 upon its own fulcrum, causing the latter to also act directly upon the spindle valve. The maximum leverage which is exerted insures the positive closing of the valve.

I have made provision for aiding the action of the float rod. A bracket 15 is shown extending laterally from the valve casing above the float rod. As shown in Fig. 5 this bracket comprises two parallel arms 16 connected at their outer ends by a pin 17. On this pin is fulcrumed a bell crank lever 18 carrying a weight 19 on the extremity of its arm 20, while its other arm 21 is movable in the space between the bracket pieces 16 and adapted to contact with a pin 22 extending upward from the float rod. This pin is illustrated as a threaded bolt to allow of adjustment. The float rod and the arm 21 of the lever are formed with slots in vertical alinement, the slot 23 of the lever arm being shown in Fig. 5. A stirrup 24 extends through these two slots and is formed with angular extremities 25 which prevent the stirrup from passing entirely through the slots which latter are long enough to afford sufficient play to the stirrup in the movement of the rod and the lever.

In operation, and assuming the valve 4 to be open, the rise of the float consequent upon the water entering the tank, will cause pin 22 to contact with lever arm 21 and swing the bell crank 18. When the weight 19 passes the center it will, by gravity, assume the position shown in full lines and arm 21 in rising will, through the medium of the stirrup, tend to aid in elevating the float rod. When the float lowers these movements are reversed, the float rod pulling the stirrup downward and consequently swinging lever 18 until it passes the center and falls into the dotted line position, at which time the impact of lever arm 21 on pin 22 will aid in depressing the float rod and opening the valve.

I claim as my invention:—

1. In a ball cock mechanism, a supply pipe, a valve controlling an outlet therefrom, a float rod having a float at its free end and adapted to directly operate the said valve, and a lever also acting upon said valve and itself actuated by said float rod.

2. In a ball cock mechanism, the combination with the valve, of a float rod directly engaging said valve and extended beyond the latter, and a lever acting on said valve and fulcrumed to the extended end of said rod.

3. In an automatic tank supply mechanism, the combination with a valve, of a pair of levers acting upon said valve, one of said levers being fulcrumed to the valve casing and having one arm in engagement with said valve, a second lever acting upon said valve and fulcrumed to the other arm of said first lever, and a float carried by said second lever.

4. In a ball cock mechanism, the combination with the valve having upper and lower recesses formed in opposite sides, of a lever fulcrumed in the valve casing and having a forked extremity entering the upper recesses, and a forked float rod entering the lower recesses and extended in both directions beyond said valve, one of the extremities of said rod being fulcrumed to said lever and the other extremity carrying a float.

5. In an automatic tank supply mechanism, the combination with the valve and the float rod, of a stationary bracket, a bell crank fulcrumed on said bracket having one of its arms in the path of movement of said rod, a weight carried by the other arm, and a stirrup forming a loose connection between said float rod and said bell crank and adapted to swing the latter consequent upon the movement of said rod.

In testimony whereof, I have signed this specification in the presence of two subscribing witnesses.

EDWARD L. DELANY.

Witnesses:
D. H. BATES, Jr.,
GRAFTON L. McGILL.

---

Copies of this patent may be obtained for five cents each, by addressing the "Commissioner of Patents, Washington, D. C."